(12) United States Patent
Ranchal et al.

(10) Patent No.: US 11,182,359 B2
(45) Date of Patent: Nov. 23, 2021

(54) DATA DEDUPLICATION IN DATA PLATFORMS

(71) Applicant: International Business Machines Corporation, Armonk, NY (US)

(72) Inventors: Rohit Ranchal, Austin, TX (US); Aris Gkoulalas-Divanis, Waltham, MA (US); Paul R. Bastide, Ashland, MA (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/740,201

(22) Filed: Jan. 10, 2020

(65) Prior Publication Data

US 2021/0216511 A1    Jul. 15, 2021

(51) Int. Cl.
  *G06F 16/00* (2019.01)
  *G06F 16/215* (2019.01)
  *G06F 16/22* (2019.01)

(52) U.S. Cl.
  CPC ........ *G06F 16/215* (2019.01); *G06F 16/2255* (2019.01); *G06F 16/2264* (2019.01)

(58) Field of Classification Search
  None
  See application file for complete search history.

(56) References Cited

U.S. PATENT DOCUMENTS

| | | | |
|---|---|---|---|
| 5,499,293 A | 3/1996 | Behram et al. | |
| 8,250,325 B2 | 8/2012 | Holdman et al. | |
| 8,412,682 B2 | 4/2013 | Zheng et al. | |
| 9,659,042 B2 | 5/2017 | Puri | |
| 10,078,643 B1 | 9/2018 | Lowry | |
| 2012/0151169 A1 | 6/2012 | Mori et al. | |
| 2014/0019423 A1 | 1/2014 | Liensberger et al. | |
| 2014/0114907 A1 | 4/2014 | Kozina et al. | |
| 2017/0038978 A1 | 2/2017 | Li et al. | |
| 2018/0341701 A1 | 11/2018 | Verma et al. | |

OTHER PUBLICATIONS

List of IBM Patents or Applications Treated as Related; Bastide, P.R., U.S. Appl. No. 16/740,212, filed Jan. 10, 2020.

(Continued)

*Primary Examiner* — Bai D Vu
(74) *Attorney, Agent, or Firm* — Sherman IP LLP; Kenneth L. Sherman; Hemavathy Perumal

(57) ABSTRACT

One embodiment of the invention provides a method for data deduplication storage management in a data platform including a plurality of data stores. The method comprises, for each data store of the plurality of data stores, determining a corresponding multi-level signature mapping data content of the data store into an ordered logical form comprising a plurality of data abstraction levels, determining a data similarity between the data store and each other data store of the plurality of data stores based on the multi-level signature corresponding to the data store and another multi-level signature corresponding to the other data store, and determining data usage of the data content of the data store. The method further comprises improving storage in the data platform by detecting duplicate data across the plurality of data stores based on each data similarity determined and each data usage determined.

20 Claims, 9 Drawing Sheets

(56) References Cited

OTHER PUBLICATIONS

Xiaolong, X. et al., "Data Deduplication Mechanism for Cloud Storage Systems", 2015 International Conference on Cyber-Enabled Distributed Computing and Knowledge Discovery, Sep. 2015, pp. 286-294, IEEE, United States.
Mell et al., "The NIST Definition of Cloud Computing," National Institute of Standards and Technology Special Publication 800-145, Sep. 2011, 7 pages.
Khayyat, Z. et al. "BigDansing: A system for big data cleansing", SIGMOD, May 2015, pp. 1215-1230, ACM, United States.
Kolb, L. et al., "Dedoop: Efficient deduplication with hadoop", Proceedings of the VLDB Endowment, Aug. 2012, pp. 1878-1881, vol. 5, No. 12, United States.
Baracaldo, N. et al., "Mitigating Poisoning Attacks on Machine Learning Models: A Data Provenance Based Approach", In Proceedings of the 10th ACM Workshop on Artificial Intelligence and Security (AISec '17), Nov. 3, 2017, pp. 103-110, ACM, New York, NY, USA.
Simmhan, Y.L. et al., "A survey of data provenance techniques," ACM Sigmod Record, 2005, pp. 1-25, United States.
W3C Interest Group, "Dataset Descriptions: HCLS Community Profile", May 14, 2015, pp. 1-33, downloaded: https://www.w3.org/TR/hcls-dataset/ on Jan. 9, 2020, United States.
Harris, J., "Growing importance of data lineage when managing data for analytics," Oct. 1, 2018, downloaded: https://blogs.sas.com/content/datamanagement/2018/10/01/importance-data-lineage-analytics/ on Jan. 9, 2020, SAS Blogs, United States.
SIMCORP GAIN (formerly AIM), "Data Lineage: Where did our data come from?", Jan. 12, 2017, pp. 1-3, blog post downloaded Jan. 9, 2020: https://www.simcorpgain.com/en/resources/data-lineage-where-did-our-data-come-from, United States.

700

```
┌─────────────────────────────────────────────────────────────────┐
│ Determining, for each data store of a data platform, a corresponding multi- │
│ level signature mapping data content of the data store into an ordered logical │ ── 701
│ form comprising a plurality of data abstraction levels          │
└─────────────────────────────────────────────────────────────────┘
                                  │
                                  ▼
┌─────────────────────────────────────────────────────────────────┐
│ Determining, for each data store of a data platform, a similarity between the │
│ data store and each other data store of the data platform based on a multi- │ ── 702
│ level signature corresponding to the data store and a multi-level signature │
│ corresponding to the other data store                           │
└─────────────────────────────────────────────────────────────────┘
                                  │
                                  ▼
┌─────────────────────────────────────────────────────────────────┐
│ Determining, for each data store of a data platform, usage of data content of │ ── 703
│ the data store                                                  │
└─────────────────────────────────────────────────────────────────┘
                                  │
                                  ▼
┌─────────────────────────────────────────────────────────────────┐
│ Improving storage in the data platform by detecting duplicate data across │
│ different data stores of the data platform based on each similarity │ ── 704
│ determined and each usage determined                            │
└─────────────────────────────────────────────────────────────────┘
```

FIG. 7

DATA DEDUPLICATION IN DATA PLATFORMS

BACKGROUND

Embodiments of the invention generally relate to data platforms, and more specifically, to a method and system for data deduplication storage management in a data platform.

SUMMARY

One embodiment of the invention provides a method for data deduplication storage management in a data platform including a plurality of data stores. The method comprises, for each data store of the plurality of data stores, determining a corresponding multi-level signature mapping data content of the data store into an ordered logical form comprising a plurality of data abstraction levels, determining a data similarity between the data store and each other data store of the plurality of data stores based on the multi-level signature corresponding to the data store and another multi-level signature corresponding to the other data store, and determining data usage of the data content of the data store. The method further comprises improving data storage in the data platform by detecting duplicate data across the plurality of data stores based on each data similarity determined and each data usage determined.

Another embodiment of the invention provides a system for data deduplication storage management in a data platform including a plurality of data stores. The system comprises at least one processor and a non-transitory processor-readable memory device storing instructions that when executed by the at least one processor causes the at least one processor to perform operations. The operations include, for each data store of the plurality of data stores, determining a corresponding multi-level signature mapping data content of the data store into an ordered logical form comprising a plurality of data abstraction levels, determining a data similarity between the data store and each other data store of the plurality of data stores based on the multi-level signature corresponding to the data store and another multi-level signature corresponding to the other data store, and determining data usage of the data content of the data store. The operations further include improving data storage in the data platform by detecting duplicate data across the plurality of data stores based on each data similarity determined and each data usage determined.

One embodiment of the invention provides a computer program product for data deduplication storage management in a data platform including a plurality of data stores. The computer program product comprises a computer readable storage medium having program instructions embodied therewith. The program instructions are executable by a processor to cause the processor to, for each data store of the plurality of data stores, determine a corresponding multi-level signature mapping data content of the data store into an ordered logical form comprising a plurality of data abstraction levels, determine a data similarity between the data store and each other data store of the plurality of data stores based on the multi-level signature corresponding to the data store and another multi-level signature corresponding to the other data store, and determine data usage of the data content of the data store. The program instructions are executable by the processor to further cause the processor to improve data storage in the data platform by detecting duplicate data across the plurality of data stores based on each data similarity determined and each data usage determined.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other objects, features, and advantages of embodiments of the invention are apparent from the following detailed description taken in conjunction with the accompanying drawings in which:

FIG. 7 is a flowchart for an example process for data deduplication storage management in a data platform, in accordance with an embodiment of the invention;

Figure 1:
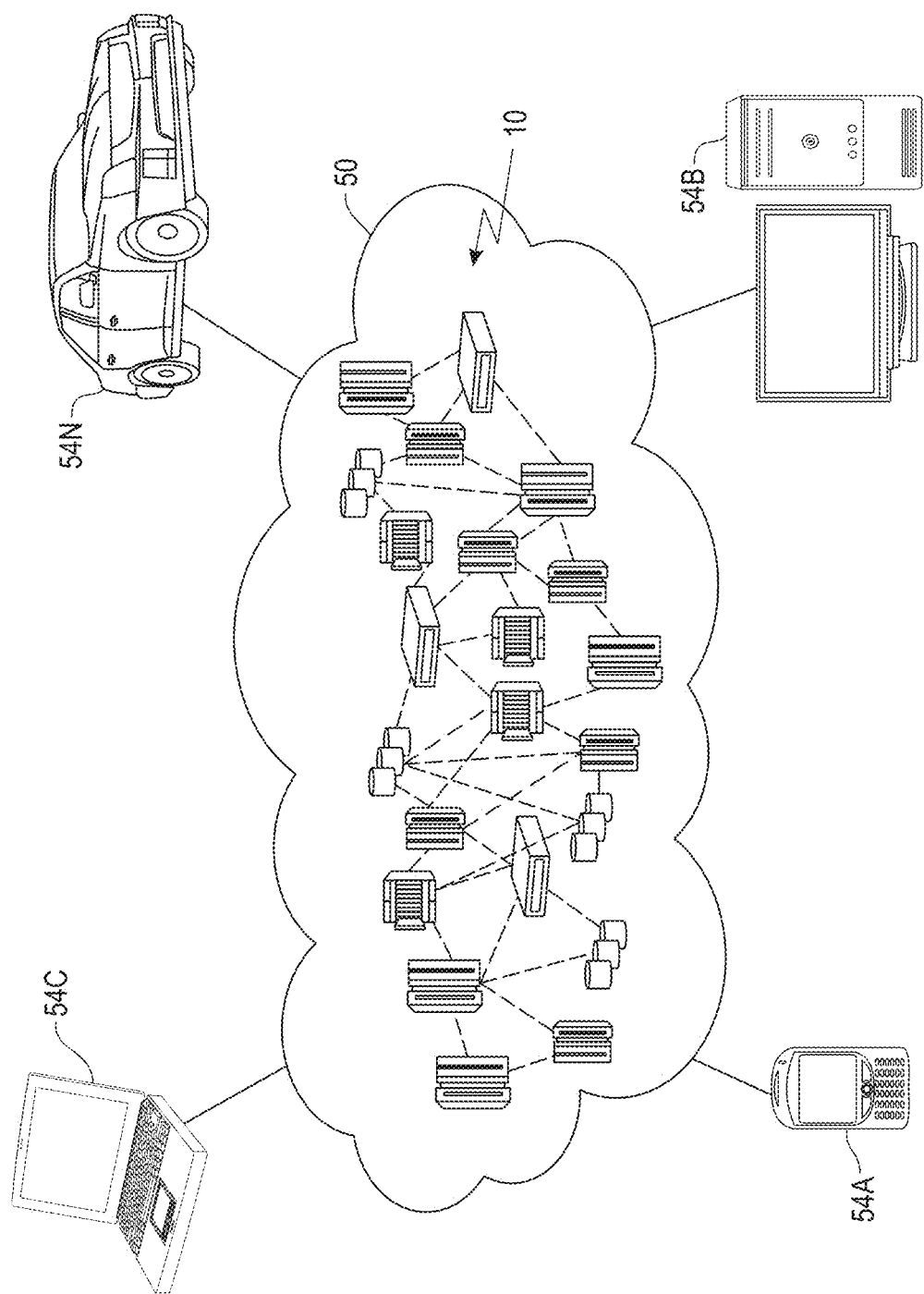
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to data platforms, and more specifically, to a method and system for data deduplication storage management in a data platform. One embodiment of the invention provides a method for data deduplication storage management in a data platform including a plurality of data stores. The method comprises, for each data store of the plurality of data stores, determining a corresponding multi-level signature mapping data content of the data store into an ordered logical form comprising a plurality of data abstraction levels, determining a data similarity between the data store and each other data store of the plurality of data stores based on the multi-level signature corresponding to the data store and another multi-level signature corresponding to the other data store, and determining data usage of the data content of the data store. The method further comprises improving data storage in the data platform by detecting duplicate data across the plurality of data stores based on each data similarity determined and each data usage determined.

Another embodiment of the invention provides a system for data deduplication storage management in a data platform including a plurality of data stores. The system comprises at least one processor and a non-transitory processor-readable memory device storing instructions that when executed by the at least one processor causes the at least one processor to perform operations. The operations include, for each data store of the plurality of data stores, determining a corresponding multi-level signature mapping data content of the data store into an ordered logical form comprising a plurality of data abstraction levels, determining a data similarity between the data store and each other data store of the plurality of data stores based on the multi-level signature corresponding to the data store and another multi-level signature corresponding to the other data store, and determining data usage of the data content of the data store. The operations further include improving data storage in the data platform by detecting duplicate data across the plurality of data stores based on each data similarity determined and each data usage determined.

One embodiment of the invention provides a computer program product for data deduplication storage management in a data platform including a plurality of data stores. The computer program product comprises a computer readable storage medium having program instructions embodied therewith. The program instructions are executable by a processor to cause the processor to, for each data store of the plurality of data stores, determine a corresponding multi-level signature mapping data content of the data store into an ordered logical form comprising a plurality of data abstraction levels, determine a data similarity between the data store and each other data store of the plurality of data stores based on the multi-level signature corresponding to the data store and another multi-level signature corresponding to the other data store, and determine data usage of the data content of the data store. The program instructions are executable by the processor to further cause the processor to improve data storage in the data platform by detecting duplicate data across the plurality of data stores based on each data similarity determined and each data usage determined.

For expository purposes, the term "data platform" generally refers to a natural software layer that controls underlying storage resources by combining data from various data sets and acting as a centralized hub where it can be accessed for analysis and integrations. For expository purposes, the term "big data" generally refers data sets whose size or type is beyond the ability of traditional relational databases to capture, manage and process the data with low latency. For expository purposes, the term "big data platform" generally refers to a data platform which combines several tools and utilities into one packaged solution for managing and analyzing big data.

In recent years, there has been increased usage of big data platforms to collect, aggregate, transform, and analyze data (e.g., healthcare data). Cloud-based data platforms leverage cloud capabilities, such as on-demand storage, scalability, independent development, and continuous delivery, to provide micro-service architectures in which services are focused on a singular functionality to efficiently perform operations. Many copies of the same data may exist across various data stores of a data platform. Examples of different data stores of a data platform include, but are not limited to, service operational databases (DBs), data lakes, data reservoirs, data marts, etc. For example, DBs maintaining healthcare data typically have a lot of duplicate fields such as location, healthcare codes, etc. Such data redundancy and data distribution can result in inefficiencies in data operations and increased costs for storage, communication, and hosting. An organization utilizing a data platform may not have visibility or an understanding of issues relating to data redundancy and ingestion of duplicate data in the data platform.

In a big data platform, frequency of data access (i.e., data usage) across different data stores and data subsets of the data platform can be different. There is a clear need to identify duplication of data and associated data usage in a big data platform, and optimize storage of the data platform by compressing data where possible.

Embodiments of the invention provide a method and system for data deduplication storage management in a data platform (e.g., a big data platform). As described in detail later herein, data deduplication storage management includes identifying duplicate data across multiple data stores of the data platform, performing data deduplication at various data abstraction levels, and ensuring efficient data storage on the data platform by increasing or optimizing data storage based on data usage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
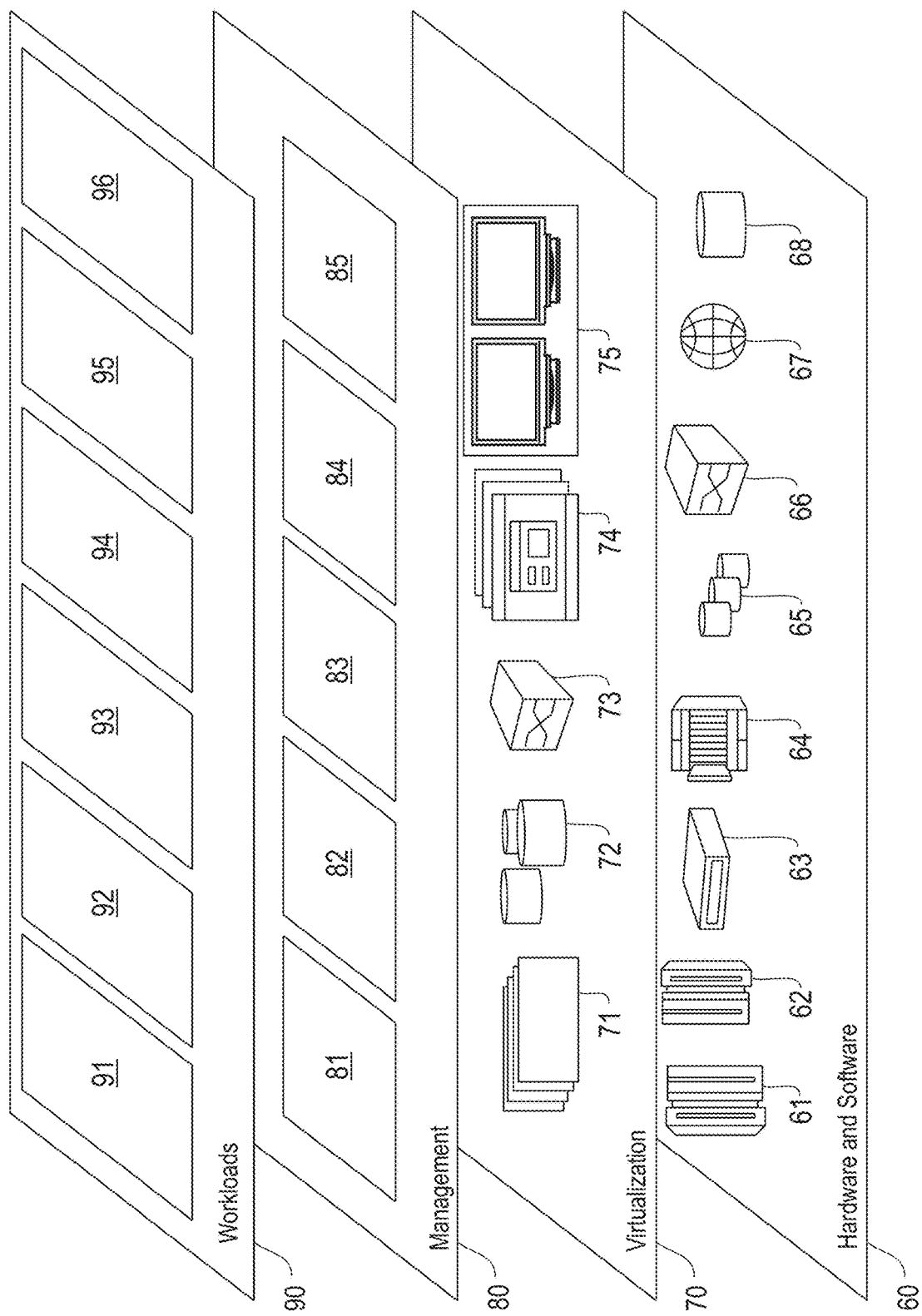
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and data deduplication storage management 96 (e.g., a data deduplication system 330, as described in detail later herein).

Figure 3:
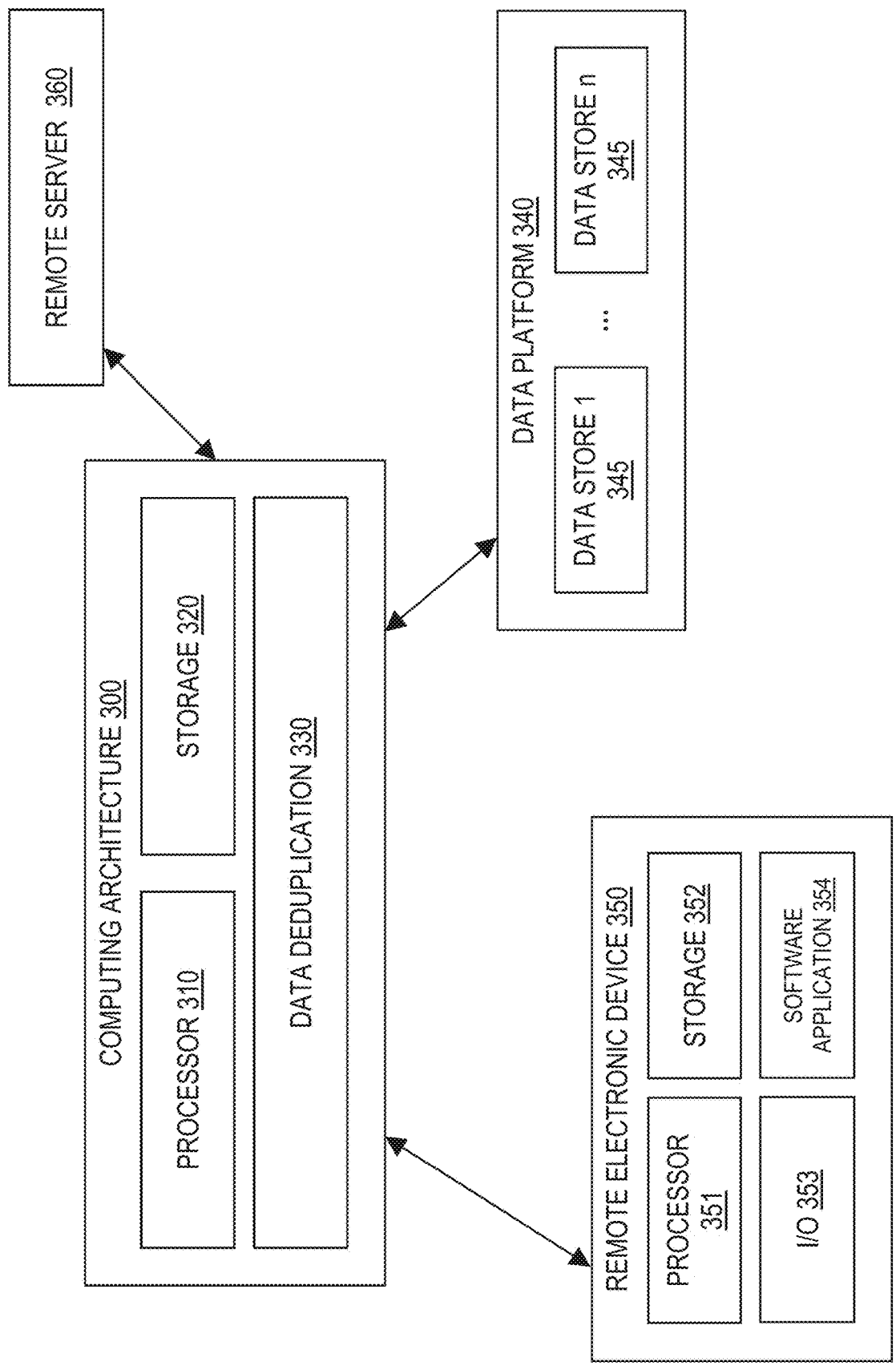
FIG. 3 illustrates an example computing architecture for implementing data deduplication storage management, in accordance with an embodiment of the invention.

FIG. 3 illustrates an example computing architecture 300 for implementing data deduplication storage management, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a data deduplication system 330 configured for data deduplication storage management in a data platform 340 comprising a plurality of different data stores 345 (e.g., DATA STORE 1, . . . , DATA STORE n, wherein n is a positive integer). As described in detail later herein, in one embodiment, the system 330 is configured to: (1) receive a new data set for ingestion into a data store 345 of the data platform 340, (2) compare the new data set against the data stores 345 of the data platform 340 to detect duplicate data in the data stores 345 with highest level of similarity to the new data set, and (3) efficiently store the new data set by selectively storing the new data set based on data usage of the duplicate data detected, if any.

In one embodiment, the system 330 is configured to detect data duplication at higher data abstraction levels. In one embodiment, the system 330 is configured to perform data compression by merging similar data blocks when there is a reduction in data usage of the data blocks. In one embodiment, the system 330 reduces costs of data communication on the data platform 340. In one embodiment, the system 330 improves performance of data access operations on the data platform 340. In one embodiment, the system 330 improves visibility into data redundancy on the data platform 340.

In one embodiment, the system 330 can be incorporated/integrated into a cloud computing environment, such as IBM Cloud, etc.

In one embodiment, the data deduplication system 330 is configured to exchange data with the data platform 340, one or more electronic devices 350, and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, big data analytics applications, etc.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc. In certain IoT embodiments, where memory is constrained, the invention reduces the duplication of data stored on the device from the multiple applications on the device, or gate the progression of data from the IoT device to the data platform.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., pre-determined thresholds, pre-determined orders, etc.), provide input, etc.

In one embodiment, an electronic device 350 and/or a remote server device 360 may be a data source providing a new data set for ingestion into a data store 345 of the data platform 340.

In one embodiment, the data deduplication system 330 may be accessed or utilized by one or more online services (e.g., AI services, NLP services, big data analytics services) hosted on a remote server device 360 and/or one or more software applications 354 (e.g., AI applications, big data analytics applications) operating on an electronic device 350.

In one embodiment, all data stores 345 of the data platform 340 can be represented under a common, unified schema of data columns. The data columns are organized in a common pattern, such as column name, column type, column value distributions. Alternatively, the data columns may be organized based on the dates of creation or first observation. For example, column M is added prior to column Q, therefore the data columns are always organized M then Q.

For expository purposes, the term "data content" as used herein generally refers to one of the following: a data store 345 of the data platform 340, a data set received by the system 330 for ingestion into a data store 345 of the data platform 340, or an area, a partition, or a data block of a data store 345 of the data platform 340. The terms "area", "partition", and "data block" are used interchangeably herein.

Figure 4:
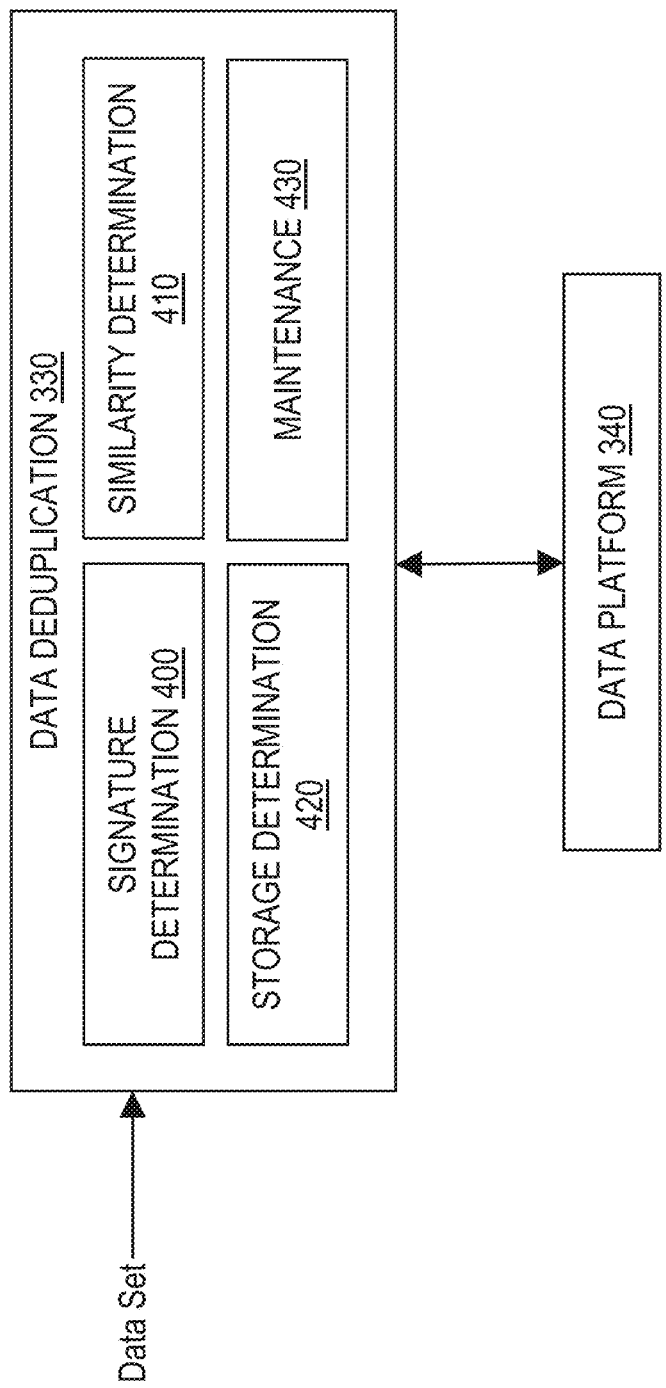
FIG. 4 illustrates an example data deduplication system, in accordance with an embodiment of the invention.

FIG. 4 illustrates an example data deduplication system 330, in accordance with an embodiment of the invention. In one embodiment, the system 330 comprises a signature determination unit 400 configured to determine a multi-level signature of data content. For example, in one embodiment, the signature determination unit 400 is configured to determine a multi-level signature of a data set received by the system 330 for ingestion into a data store 345 of the data platform 340 (i.e., new data content to be added to the data stores 345 of the data platform 340). As another example, in one embodiment, the signature determination unit 400 is configured to determine a multi-level signature of each data store 345 of the data platform 340.

A multi-level signature of data content maps the data content to an abstracted ordered logical form comprising a plurality of data abstraction levels. A multi-level signature corresponds to a data structure. Examples of different data structures that a multi-level signature can correspond to include, but are not limited to, a pyramid data structure, a quad-tree data structure, an R-tree data structure, etc.

In one embodiment, before computing a multi-level signature of data content, the signature determination unit 400 is configured to determine whether one or more dimensions (e.g., columns, rows) of the data content are arranged in accordance with one or more corresponding pre-determined orders. For example, in one embodiment, the signature determination unit 400 is configured to: (1) determine whether columns of the data content are arranged in a first pre-determined order for columns (e.g., lexicographical), and (2) determine whether rows of the data content are arranged in a second pre-determined order for rows (e.g., numerical or lexicographical based on a key attribute, i.e., an attribute that has a unique value for each individual data record of the data content). To effectively discover duplicate data, each pre-determined order corresponding to each dimension of the data content must be common to all the data stores 345 of the data platform 340 (i.e., same pre-determined orders across all the data stores 345 of the data platform 340).

In one embodiment, the signature determination unit 400 is configured to assign a columnar and a columnar type to data content that is not labeled or identified. For example, in one embodiment, based on an assumption that a set of five digits is associated with a zip code, the signature determination unit 400 is configured to label data content comprising five digits (e.g., 01010) as categorical and textual (finite) or numerical (continuous).

In one embodiment, the signature determination unit 400 is configured to: (1) arrange, or order, the data included in a dimension of data content in a logical ordering to obtain ordered data content, and (2) compute a signature of the data content based on the ordered data content. In one embodiment, the signature determination unit 400 is configured to determine a logical ordering that a dimension of data content is arranged, or ordered, based on application context, behavioral metadata, change related data, and shape related data. The logical ordering enables the system 330 to detect larger blocks of duplicate data in the data stores 345 of the data platform 340, thereby enhancing, or improving, data compression.

In one embodiment, the signature determination unit 400 ignores or normalizes temporal values (e.g., date values and time values) included in a dimension of data content when arranging the dimension in a logical ordering. In one embodiment, any value included in a dimension of data content requiring transformation (e.g., pre-processing) is transformed before the signature determination unit 400 arranges the dimension in a logical ordering.

For example, in one embodiment, the signature determination unit 400 is configured to arrange columns of data content in a logical ordering. In one embodiment, the logical ordering involves ordering categorical columns of the data content in alphabetical order, then ordering continuous columns of the data content in alphabetical order. For example, assume the signature determination unit 400 receives a data set comprising healthcare data, where columns of the data set are arranged in the following pre-determined order: Patient ID, Name, Study, and Location. The signature determination unit 400 is configured to arrange/order columns of the data set in the following logical ordering: Study, Name, Patient ID, Location (i.e., ordering categorical columns Study and Name in alphabetical order, then ordering continuous columns Patient ID and Location in alphabetical order). The signature determination unit 400 arranges/orders data included in the columns based on the categorical column Study, then the other categorical column Name, such that the data set is organized in a similar entropy. The system 300 utilizes the resulting ordered data set to compute a signature of the data set. Table 1 below provides an example of the resulting ordered data set.

TABLE 1

| Study | Name  | Patient ID | Location  |
|-------|-------|------------|-----------|
| A     | Paula | 3          | Frankfurt |
| A     | Paula | 3          | Frankfurt |
| B     | Alex  | 1          | Munich    |

In another embodiment, the logical ordering involves a mixed ordering (i.e., combination) of categorical ordering then numerical ordering, resulting in a mixed column. For example, assume the signature determination unit 400 receives a data set comprising healthcare data, where columns of the data set are arranged in the following pre-determined order: Patient ID, Name, Study, and Location. The signature determination unit 400 is configured to arrange/order columns of the data set in one of the following logical orderings: (1) Study-Name->Patient ID, Location, or (2) Name-Study->Patient ID, Location (i.e., Study-Name or Name-Study is a mixed column).

In another embodiment, the system 330 is configured to detect duplicate data in the data platform 340 even if columns of the data stores 345 of the data platform 340 are not arranged in the same order or data content is missing one or more columns present in another data content.

In one embodiment, the signature determination unit 400 is configured to determine a multi-level signature of data content by partitioning the data content based on a logical ordering that a dimension of the data content is arranged or ordered in. In one embodiment, a multi-level signature of data content maps the data content to a pyramid data structure comprising a plurality of data abstraction levels. The signature determination unit 400 is configured to build, or generate, a pyramid data structure top-down based on ordered data content (i.e., a dimension of the data content is arranged in a logical ordering). Specifically, for a top, or root, data abstraction level of the pyramid data structure, the signature determination unit 400 is configured to determine a hash value (e.g., a message digest, such as MD5) of an entirety of the ordered data content, wherein the hash value is stored in the top/root data abstraction level. For each lower data abstraction level of the pyramid data structure, the signature determination unit 400 is configured to: (1) logically split the ordered data content into multiple partitions (e.g., quadrants row-wise and column-wise), and (2) determine a hash value of each partition of the multiple partitions, wherein each hash value of each partition of the multiple partitions is stored in the lower data abstraction level. The signature determination unit 400 logically splits the ordered data content into multiple partitions and determines a hash value of each partition of the multiple partitions recursively until the ordered data content is split into individual data records of the ordered data content (i.e., a size of each partition reduces with each iteration). For each individual data record of the ordered data content, the signature determination unit 400 is configured to determine a hash value of the individual data record, wherein each hash value of each individual data record of the ordered data content is stored in a lowest level of the pyramid data structure.

In one embodiment, data content has a corresponding hash table (e.g., hash table 550 in FIG. 5) maintaining, for each individual data record of the data content, a corresponding identifier (e.g., CID in FIG. 5) indicative of a cell (e.g., grid cell 520 in FIG. 5) of a lowest data abstraction level of a data structure that a multi-level signature of the data content corresponds to. Each individual data record of the data content has a corresponding entry in the hash table that maps the individual data record to a cell of the lowest data abstraction level of the data structure that stores a hash value of the individual data record.

In one embodiment, the system 330 comprises a similarity determination unit 410 configured to determine a similarity between first data content and second data content based on a first multi-level signature of the first data content and a second multi-level signature of the second data content. For example, in one embodiment, for each data store 345 of the data platform 340, the similarity determination unit 410 is configured to compute a similarity between the data store 345 and a different data store 345 of the data platform 340 based on a multi-level signature of the data store 345 and a multi-level signature of the different data store 345. As another example, in one embodiment, for each data store 345 of the data platform 340, the similarity determination unit 410 is configured to compute a similarity between the data store 345 and a data set received by the system 330 for ingestion into the data platform 340 based on a multi-level signature of the data store 345 and a multi-level signature of the data set.

In one embodiment, if each multi-level signature corresponds to a pyramid data structure, the similarity determination unit 410 is configured to determine the similarity between the first data content and the second data content by comparing a first pyramid data structure corresponding to the first multi-level signature against a second pyramid data structure corresponding to the second multi-level signature to detect one or more data blocks in both the first data content and the second data content that are common or similar ("common data blocks"). For example, in one embodiment, the similarity determination unit 410 is configured to compare the first pyramid data structure against the second pyramid data structure by examining (i.e., vising) both pyramid data structures in a top-down manner. By examining both pyramid data structures in the top-down manner, the similarity determination unit 410 is able to detect duplicate data (i.e., one or more common data blocks) at higher data abstraction levels (e.g., at a top/root data abstraction level of each pyramid data structure). If duplicate data is detected, the similarity determination unit 410 ceases examination of both pyramid data structures, thereby removing the need to examine any remaining lower data abstraction level of each pyramid data structure that has yet to be examined (e.g., a lowest data abstraction level of each pyramid data structure).

In one embodiment, in response to the system 330 receiving a data set for ingestion into the data platform 340, the similarity determination unit 410 is configured to generate information indicative of whether at least one data store 345 of the data platform 340 includes at least one partition comprising one or more data blocks common or similar to one or more data blocks of the data set. For example, if a similarity between the data set and a data store 345 of the data platform 340 satisfies a pre-determined similarity threshold, the similarity determination unit 410 is configured to generate information identifying a partition of the data store 345 as a similar partition in the data platform 340 for the data set (i.e., the partition comprises common or similar data blocks). As another example, if none of the similarities determined between the data set and each data store 345 of the data platform 340 satisfies the pre-determined similarity threshold, the similarity determination unit 410 is configured to generate information indicating that no similar partitions in the data platform 340 for the data set were identified.

In one embodiment, the system 330 comprises a storage determination unit 420 configured to: (1) track data usage of a data block across the different data stores 345 of the data platform 340, and (2) selectively store a data set received by the system 330 for ingestion into the data platform 340 based on data usage of similar partitions in the data platform 340 identified for the data set, if any.

In one embodiment, a data block stored in the data platform 340 is classified with a data usage classification indicative of data usage of the data block. In one embodiment, the storage determination unit 420 is configured to classify a data block with one of the following data usage classifications: frequently accessed data (e.g., "hot data"), less frequently accessed data (e.g., "warm data"), or rarely accessed data (e.g., "cold data"). In one embodiment, a data block classified as frequently accessed/hot data, less frequently accessed/warm data, or rarely accessed/cold data is labeled/tagged as "Level i", wherein $i \in [0,N]$, and N is a positive integer (e.g., if a data block is classified as frequently accessed/hot data, the data block is labeled/tagged as "Level 0"; if a data block is classified as rarely accessed/cold data, the data block is labeled/tagged as "Level N").

In one embodiment, in response to the system 330 receiving a data set for ingestion into the data platform 340, the storage determination unit 420 is configured to determine an appropriate data store 345 of the data platform 340 to store the data set in based on data usage classifications, performance, and costs. Data usage classifications across data subsets and data store 345 can help in data compression, which in turn can result in optimized data access, and reduced costs for storage and communication.

In one embodiment, for each data store 345 of the data platform 340, the storage determination unit 420 is configured to determine whether the data store 345 is an appropriate data store 345 in which to store the data set. The storage determination unit 420 is configured to receive information indicative of whether the data store 345 includes a similar partition for the data set (e.g., from the similarity determination unit 410). If the data store 345 includes a similar partition for the data set, the storage determination unit 420 is configured to look up data usage of the similar partition. If the similar partition is classified as frequently accessed/hot data, the storage determination unit 420 is configured to store the data set in the same data store 345, and update a hash table for the data store 345 accordingly. If the similar partition is classified as less frequently accessed/warm data or rarely accessed, cold data, instead of storing the data set in the data store 345, the storage determination unit 420 is configured to store instead in the data store 345 a reference (e.g., a pointer) for the data set that references the similar partition in the same data store 345, and update a hash table for the data store 345 accordingly.

If the data store 345 does not include a similar partition for the data set, the storage determination unit 420 is configured to look up a multi-level signature of the data set in other hash tables for other data stores 345 of the data platform 340 (e.g., via the similarity determination unit 410). If a different data store 345 includes a similar partition for the data set and the similar partition of the different data store 345 is classified as frequently accessed/hot data, the storage determination unit 420 is configured to store the data set in the data store 345, and update a hash table for the data store 345 accordingly. If a different data store 345 includes a similar partition for the data set and the similar partition of the different data store 345 is classified as less frequently accessed/warm data or rarely accessed/cold data, instead of storing the data set in the data store 345, the storage determination unit 420 is configured to store instead in the data store 345 a reference (e.g., a pointer) for the data set that references the similar partition in the different data store 345, and update a hash table for the data store 345 accordingly.

If no data store 345 of the data platform 340 includes a similar partition for the data set, the storage determination unit 420 is configured to store the data set in the data store 345, and update a hash table for the data store 345 accordingly.

In one embodiment, the system 330 comprises a maintenance unit 430 configured to perform periodic maintenance (e.g., nightly, weekly, monthly, etc.) on each data store 345 of the data platform 340 to track one or more changes in data similarity and data usage of the data store 345. In one embodiment, if a set of existing partitions in the data store 345 are identified as similar partitions (e.g., via the similarity determination unit 410), the maintenance unit 430 is configured to look up data usage of the set of existing partitions, and selectively perform one or more operations based on the data usage of the set of existing partitions. For example, if the set of existing partitions are classified with a data usage classification that has changed to less frequently accessed/warm data, the maintenance unit 430 is configured to: (1) merge the set of existing partitions into a single partition ("merged portion") in the same data store 345, and (2) update each existing partition of the set with a reference to the merged portion in the same data store 345. As another example, if the set of existing partitions are classified with a data usage classification that has changed to rarely accessed, cold data, the maintenance unit 430 is configured to: (1) look up a similar partition in a different data store 345 of the data platform 340 (e.g., via the similarity determination unit 410), and (2) if a different data store 345 includes a similar partition, merge the set of existing portions and the similar portion of the different data store 345 into a single portion ("merged portion") in the different data store 345, and update each existing partition of the set in the data store 345 and the similar portion of the different data store 345 with a reference to the merged partition in the different data store 345.

For expository purposes, the term "referenced data content" as used herein generally refers to one of the following: a data set received by the system 330 for ingestion into a data store 345 of the data platform 340, or an area, a partition, or a data block of a data store 345 of the data platform 340. As each data store 345 of the data platform 340 has a corresponding multi-level signature representing an abstracted ordered logical form, the signature determination unit 400 maps referenced data content in the different data stores 345 of the data platform 340 into a plurality of abstracted ordered logical forms via the multi-level signatures of the different data stores 345. The similarity determination unit 410 is configured to determine a similarity value for each of the plurality of abstracted ordered logical forms, wherein each similarity value for each abstracted ordered logical form represents a similarity between the referenced data content and data content of a data store 345 of the data platform 340 that corresponds to the abstracted ordered logical form. The storage determination unit 420 and/or the maintenance unit 430 is configured to optimize storage of the referenced data content in the data platform 340 based on each similarity value for each of the plurality of abstracted ordered logical forms and data usage of the referenced data content.

Figure 5:
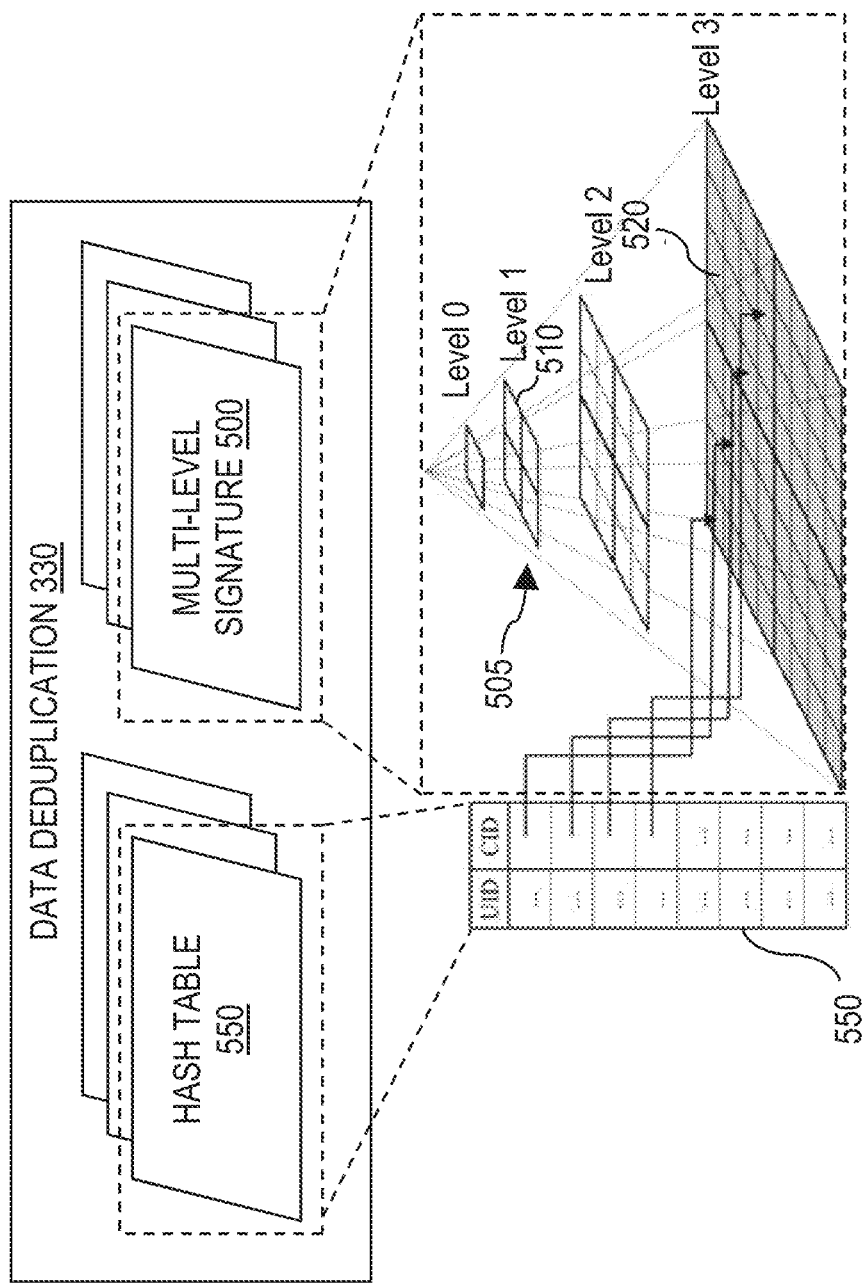
FIG. 5 illustrates an example multi-level signature of data content, in accordance with an embodiment of the invention.

FIG. 5 illustrates an example multi-level signature 500 of data content, in accordance with an embodiment of the invention. In one embodiment, the system 330 maintains different multi-level signatures 500 of different data content (e.g., a multi-level signature of a data set for ingestion into the data platform 340, a multi-level signature of a data store 345 of the data platform 340, etc.). In one embodiment, the system 330 maintains different hash tables 550 corresponding to different content (e.g., a hash table corresponding to a data set for ingestion into the data platform 340, a hash table corresponding to a data store 345 of the data platform 340, etc.).

In one embodiment, a multi-level signature 500 of data content maps the data content into a grid-based pyramid data structure 505 comprising a plurality of data abstraction levels 510. The pyramid data structure 505 hierarchically decomposes spatial space into the plurality of data abstraction levels 510, wherein each data abstraction level 510 of height h has $4^{11}$ grid cells 520, $h \in [0, H]$, and H is a positive integer. For example, as shown in FIG. 5, if H=3, the plurality of data abstraction levels 510 comprises: (1) a top/root data abstraction level 510 of height h=0 ("Level 0") comprising a single grid cell 520 that covers the entire top/root level, (2) a lower data abstraction level 510 of height h=1 ("Level 1") comprising 4 grid cells 520, (3) a lower data abstraction level 510 of height h=2 ("Level 2") comprising 16 grid cells 520, and (4) a lowest data abstraction level 510 of height h=3 ("Level 3") comprising 64 grid cells 520.

In one embodiment, each grid cell 520 of the pyramid data structure 505 maintains/stores a hash value (e.g., a message digest, such as MD5). For example, in one embodiment, the single grid cell 520 of the top/root data abstraction level 510 of height h=0 ("level 0") maintains stores a hash value of the entire data content, and each grid cell 520 of the lowest data abstraction level 510 of height h=3 ("level 3") maintains/stores a hash value of an individual data record of the data content. Each hash value maintained/stored in each grid cell 520 of the pyramid data structure 505 is computed via the signature determination unit 400.

In one embodiment, each grid cell 520 of the pyramid data structure 505 has a corresponding identifier CID.

In one embodiment, the system 330 maintains for the data content a corresponding hash table 550 that maps each individual data record of the data content to a corresponding grid cell 520 of the pyramid data structure 505. The hash table 550 comprises, for each individual data record of the data content, a corresponding entry for the individual data record. For example, in one embodiment, each entry corresponding to each individual data record of the data content is of the form (UID, CID), wherein UID is an identifier for the individual data record, and CID is an identifier for a grid cell 520 of the lowest data abstraction level 510 of the pyramid data structure 505 that the individual data record is mapped to.

In another embodiment, a multi-level signature 500 of data content maps the data content into a different data structure, such as a quad-tree data structure, an R-tree data structure, etc.

Figure 6:
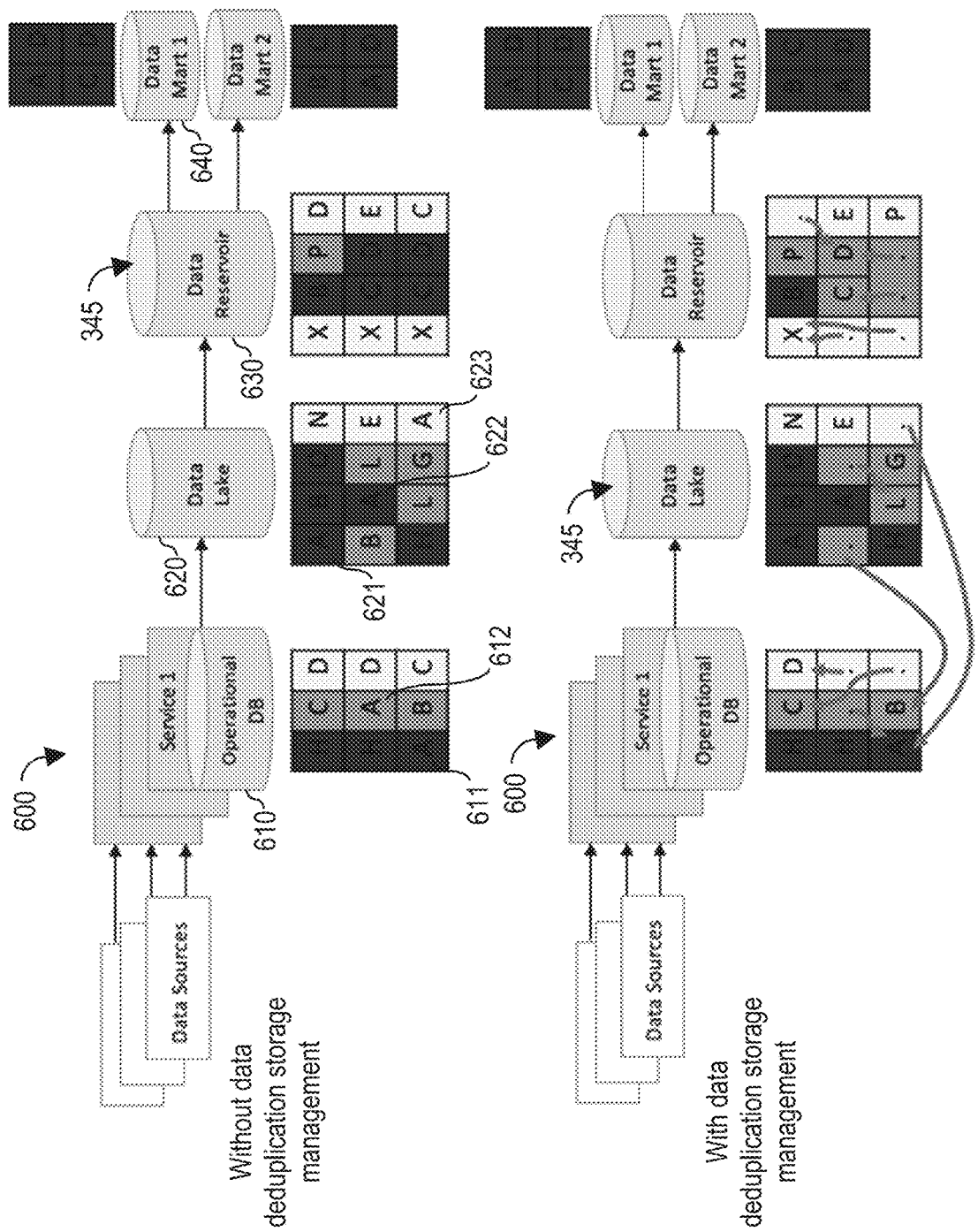
FIG. 6 illustrates a comparison between a data platform without data deduplication storage management enabled, and the same data platform with data deduplication storage management enabled, in accordance with an embodiment of the invention.

FIG. 6 illustrates a comparison between a data platform 600 without data deduplication storage management enabled, and the same data platform 600 with data deduplication storage management enabled, in accordance with an embodiment of the invention. In one embodiment, if data deduplication storage management is enabled, the system 330 is invoked to perform data deduplication storage management for the data platform 600.

As shown in FIG. 6, the data platform 600 comprises different data stores 345 (FIG. 3), such as an operational DB 610, a data lake 620, a data reservoir 630, and one or more data marts 640. As shown in FIG. 6, without data deduplication storage management enabled, the different data stores 345 maintain/store duplicates of data that are classified as less frequently accessed/warm data or rarely accessed/cold data. With data deduplication storage management enabled, the system 330 merges existing portions of the different data stores 345 that comprise less frequently accessed/warm data or rarely accessed/cold data with a particular hash value into a single portion of one of the different data stores 345 that comprises frequently accessed data with the same hash value ("merged portion"), and updates each existing portion of the different data stores 345 that has been merged with a reference to the merged portion across the different data stores 345.

For example, without data deduplication storage management enabled, the operational DB 610 includes a partition 611 comprising frequently accessed/hot data with hash value A and a different partition 612 comprising less frequently accessed/warm data with hash value A, and the data lake 620 includes a partition 621 comprising frequently accessed/hot data with hash value A, a different partition 622 comprising frequently accessed/hot data with hash value A, and a different partition 623 comprising rarely accessed/cold data with hash value A. With data deduplication storage management enabled, the system 330 merges existing portions 612 and 623 that comprise less frequently accessed/warm data or rarely accessed/cold data with hash value A into the portion 611 that comprises frequently accessed/hot data with hash value A, and updates each existing portion 612, 623 with a reference to the portion 611. As shown in FIG. 6, similar operations are performed for existing portions of the different data stores 345 that comprise less frequently accessed/warm data or rarely accessed/cold data with hash values B, C, D, L, or X.

FIG. 7 is a flowchart for an example process 700 for data deduplication storage management in a data platform, in accordance with an embodiment of the invention. Process block 701 includes determining, for each data store of a data platform, a corresponding multi-level signature mapping data content of the data store into an ordered logical form comprising a plurality of data abstraction levels. Process block 702 includes determining, for each data store of a data platform, a similarity between the data store and each other data store of the data platform based on a multi-level signature corresponding to the data store and a multi-level signature corresponding to the other data store. Process block 703 includes determining, for each data store of a data platform, usage of data content of the data store. Process block 704 includes improving storage in the data platform by detecting duplicate data across different data stores of the data platform based on each similarity determined and each usage determined.

In one embodiment, process blocks 701-704 are performed by one or more components of the system 330.

Figure 8:
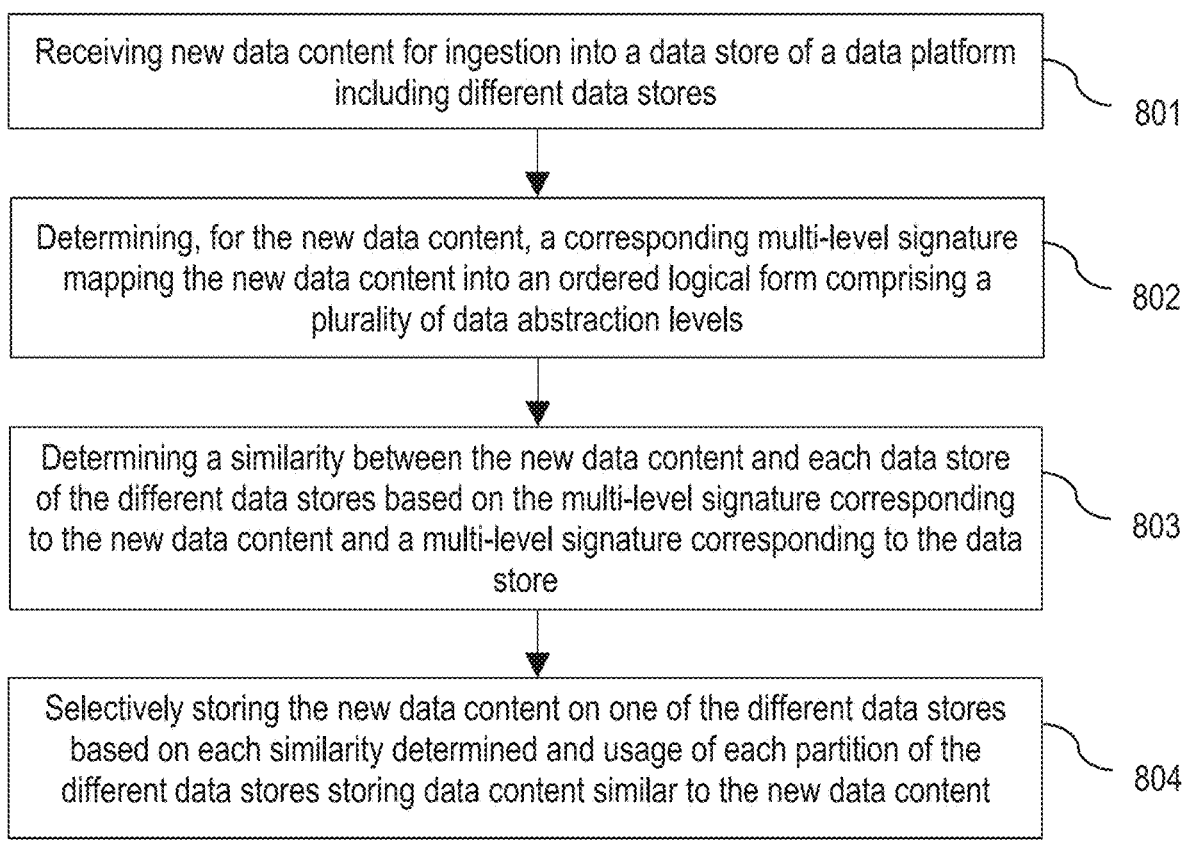
FIG. 8 is a flowchart for an example process for controlling ingestion of new data content into a data store of a data platform, in accordance with an embodiment of the invention.

FIG. 8 is a flowchart for an example process 800 for controlling ingestion of new data content into a data store of a data platform, in accordance with an embodiment of the invention. Process block 801 includes receiving new data content for ingestion into a data store of a data platform including different data stores. Process block 802 includes determining, for the new data content, a corresponding multi-level signature mapping the new data content into an ordered logical form comprising a plurality of data abstraction levels. Process block 803 includes determining a similarity between the new data content and each data store of the different data stores based on the multi-level signature corresponding to the new data content and a multi-level signature corresponding to the data store. Process block 804 includes selectively storing the new data content on one of the different data stores based on each similarity determined and usage of each partition of the different data stores storing data content similar to the new data content.

In one embodiment, process blocks 801-804 are performed by one or more components of the system 330.

Figure 9:
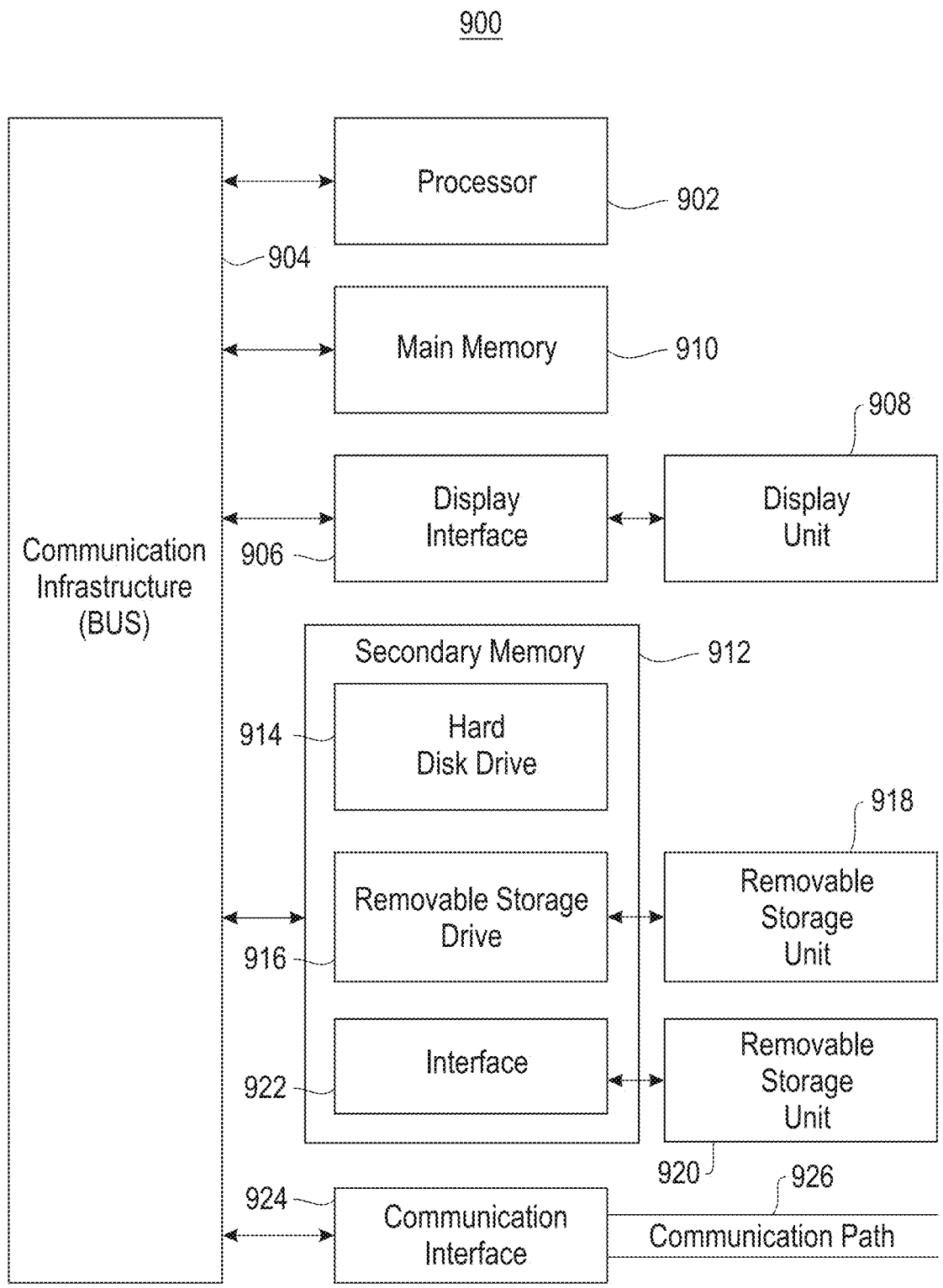
FIG. 9 is a high-level block diagram showing an information processing system useful for implementing an embodiment of the invention.

FIG. 9 is a high-level block diagram showing an information processing system 900 useful for implementing one embodiment of the invention. The computer system includes one or more processors, such as processor 902. The processor 902 is connected to a communication infrastructure 904 (e.g., a communications bus, cross-over bar, or network).

The computer system can include a display interface 906 that forwards graphics, text, and other data from the voice communication infrastructure 904 (or from a frame buffer not shown) for display on a display unit 908. In one embodiment, the computer system also includes a main memory 910, preferably random access memory (RAM), and also includes a secondary memory 912. In one embodiment, the secondary memory 912 includes, for example, a hard disk drive 914 and/or a removable storage drive 916, representing, for example, a floppy disk drive, a magnetic tape drive, or an optical disk drive. The removable storage drive 916 reads from and/or writes to a removable storage unit 918 in a manner well known to those having ordinary skill in the art. Removable storage unit 918 represents, for example, a floppy disk, a compact disc, a magnetic tape, or an optical disk, etc. which is read by and written to by removable storage drive 916. As will be appreciated, the removable storage unit 918 includes a computer readable medium having stored therein computer software and/or data.

In alternative embodiments, the secondary memory 912 includes other similar means for allowing computer programs or other instructions to be loaded into the computer system. Such means include, for example, a removable storage unit 920 and an interface 922. Examples of such means include a program package and package interface (such as that found in video game devices), a removable memory chip (such as an EPROM, or PROM) and associated socket, and other removable storage units 920 and interfaces 922, which allows software and data to be transferred from the removable storage unit 920 to the computer system.

In one embodiment, the computer system also includes a communication interface 924. Communication interface 924 allows software and data to be transferred between the computer system and external devices. In one embodiment, examples of communication interface 924 include a modem, a network interface (such as an Ethernet card), a communication port, or a PCMCIA slot and card, etc. In one embodiment, software and data transferred via communication interface 924 are in the form of signals which are, for example, electronic, electromagnetic, optical, or other signals capable of being received by communication interface 924. These signals are provided to communication interface 924 via a communication path (i.e., channel) 926. In one embodiment, this communication path 926 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data deduplication storage management in a data platform including a plurality of data stores, comprising:
    for each data store of the plurality of data stores:
        determining a multi-level signature corresponding to the data store, wherein the multi-level signature corresponding to the data store maps data content of the data store into an ordered logical form comprising a plurality of data abstraction levels;
        determining a data similarity between the data store and each other data store of the plurality of data stores based on the multi-level signature corresponding to the data store and another multi-level signature corresponding to the other data store, wherein the data similarity comprises one or more data blocks included in both the data store and the other data store that are common; and
        determining data usage of the data content of the data store;
    detecting data blocks of duplicate data across the plurality of data stores to merge based on each data similarity determined and each data usage determined; and
    merging the data blocks of duplicate data detected.

2. The method of claim 1, wherein the determining the multi-level signature corresponding to the data store comprises:
    ordering the data content of the data store by ordering a dimension of the data content in a logical ordering;
    determining a hash value of an entirety of the ordered data content, and storing the hash value of the entirety of the ordered data content in a top data abstraction level of the ordered logical form; and
    partitioning the ordered data content into multiple partitions, determining a hash value of each partition of the multiple partitions, and storing each hash value of each partition of the multiple partitions in a lower data abstraction level of the ordered logical form, wherein a lowest level of the ordered logical form stores each hash value of each individual data record of the ordered data content.

3. The method of claim 2, wherein the ordered logical form comprises a pyramid data structure including the plurality of data abstraction levels, each data abstraction level comprises one or more grid cells, and each grid cell stores a hash value.

4. The method of claim 1, wherein the determining the data similarity between the data store and each other data store of the plurality of data stores comprises:
    detecting one or more data blocks included in both the data store and the other data store that are common by examining the multi-level signature corresponding to the data store against the another multi-level signature corresponding to the other data store in a top-down manner.

5. The method of claim 1, wherein the determining the data usage of the data content of the data store comprises:
    classifying each data block included in the data store with a corresponding data usage classification indicative of frequency at which the data block is accessed.

6. The method of claim 1, further comprising:
    receiving new data content for ingestion into a data store of the data platform;
    determining a new multi-level signature corresponding to the new data content;
    determining data similarities between the new data content and each data store of the plurality of data stores based on the new multi-level signature corresponding to the new data content and each multi-level signature corresponding to each data store of the plurality of data stores; and
    selectively storing the new data content on one of the plurality of data stores based on the data similarities determined.

7. The method of claim 1, further comprising:
    for each data store of the plurality of data stores, tracking one or more changes in data usage of data content of the data store.

8. A system for data deduplication storage management in a data platform including a plurality of data stores, comprising:
    at least one processor; and
    a non-transitory processor-readable memory device storing instructions that when executed by the at least one processor causes the at least one processor to perform operations including:
        for each data store of the plurality of data stores:
            determining a multi-level signature corresponding to the data store, wherein the multi-level signature corresponding to the data store maps data content of the data store into an ordered logical form comprising a plurality of data abstraction levels;
            determining a data similarity between the data store and each other data store of the plurality of data stores based on the multi-level signature corresponding to the data store and another multi-level signature corresponding to the other data store, wherein the data similarity comprises one or more data blocks included in both the data store and the other data store that are common; and determining data usage of the data content of the data store;

detecting data blocks of duplicate data across the plurality of data stores to merge based on each data similarity determined and each data usage determined; and merging the data blocks of duplicate data detected.

9. The system of claim 8, wherein the determining the multi-level signature corresponding to the data store comprises:

ordering the data content of the data store by ordering a dimension of the data content in a logical ordering;

determining a hash value of an entirety of the ordered data content, and storing the hash value of the entirety of the ordered data content in a top data abstraction level of the ordered logical form; and partitioning the ordered data content into multiple partitions, determining a hash value of each partition of the multiple partitions, and storing each hash value of each partition of the multiple partitions in a lower data abstraction level of the ordered logical form, wherein a lowest level of the ordered logical form stores each hash value of each individual data record of the ordered data content.

10. The system of claim 9, wherein the ordered logical form comprises a pyramid data structure including the plurality of data abstraction levels, each data abstraction level comprises one or more grid cells, and each grid cell stores a hash value.

11. The system of claim 8, wherein the determining the data similarity between the data store and each other data store of the plurality of data stores comprises:

detecting one or more data blocks included in both the data store and the other data store that are common by examining the multi-level signature corresponding to the data store against the another multi-level signature corresponding to the other data store in a top-down manner.

12. The system of claim 8, wherein the determining the data usage of the data content of the data store comprises:

classifying each data block included in the data store with a corresponding data usage classification indicative of frequency at which the data block is accessed.

13. The system of claim 8, further comprising:

receiving new data content for ingestion into a data store of the data platform;

determining a new multi-level signature corresponding to the new data content; determining data similarities between the new data content and each data store of the plurality of data stores based on the new multi-level signature corresponding to the new data content and each multi-level signature corresponding to each data store of the plurality of data stores; and selectively storing the new data content on one of the plurality of data stores based on the data similarities determined.

14. The system of claim 8, wherein the operations further include:

for each data store of the plurality of data stores, tracking one or more changes in data usage of data content of the data store.

15. A computer program product for data deduplication storage management in a data platform including a plurality of data stores, the computer program product comprising a computer readable storage medium having program instructions embodied therewith, the program instructions executable by a processor to cause the processor to:

for each data store of the plurality of data stores:

determine a multi-level signature corresponding to the data store, wherein the multi-level signature corresponding to the data store maps data content of the data store into an ordered logical form comprising a plurality of data abstraction levels;

determine a data similarity between the data store and each other data store of the plurality of data stores based on the multi-level signature corresponding to the data store and another multi-level signature corresponding to the other data store, wherein the data similarity comprises one or more data blocks included in both the data store and the other data store that are common; and determine data usage of the data content of the data store;

detect data blocks of duplicate data across the plurality of data stores to merge based on each data similarity determined and each data usage determined; and merge the data blocks of duplicate data detected.

16. The computer program product of claim 15, wherein the program instructions are executable by the processor to cause the processor to determine the multi-level signature corresponding to the data store by:

ordering the data content of the data store by ordering a dimension of the data content in a logical ordering;

determining a hash value of an entirety of the ordered data content, and storing the hash value of the entirety of the ordered data content in a top data abstraction level of the ordered logical form; and partitioning the ordered data content into multiple partitions, determining a hash value of each partition of the multiple partitions, and storing each hash value of each partition of the multiple partitions in a lower data abstraction level of the ordered logical form, wherein a lowest level of the ordered logical form stores each hash value of each individual data record of the ordered data content.

17. The computer program product of claim 15, wherein the program instructions are executable by the processor to cause the processor to determine the data similarity between the data store and each other data store of the plurality of data stores by:

detecting one or more data blocks included in both the data store and the other data store that are common by examining the multi-level signature corresponding to the data store against the another multi-level signature corresponding to the other data store in a top-down manner.

18. The computer program product of claim 15, wherein the program instructions are executable by the processor to cause the processor to determine the data usage of the data content of the data store by:

classifying each data block included in the data store with a corresponding data usage classification indicative of frequency at which the data block is accessed.

19. The computer program product of claim 15, wherein the program instructions are executable by the processor to cause the processor to:

receive new data content for ingestion into a data store of the data platform;

determine a new multi-level signature corresponding to the new data content;

determine data similarities between the new data content and each data store of the plurality of data stores based on the new multi-level signature corresponding to the new data content and each multi-level signature corresponding to each data store of the plurality of data stores; and selectively store the new data content on one of the plurality of data stores based on the data similarities determined.

20. The computer program product of claim 15, wherein the program instructions are executable by the processor to further cause the processor to:

for each data store of the plurality of data stores, track one or more changes in data usage of data content of the data store.

\* \* \* \* \*